(12) United States Patent
DeMarco

(10) Patent No.: US 6,679,192 B2
(45) Date of Patent: Jan. 20, 2004

(54) INTEGRATED ENTRY AIR CUSHION MARINE VESSEL AND MARINE PLATFORM

(76) Inventor: Peter C. DeMarco, 1912 SW. Coconut Dr., Fort Lauderdale, FL (US) 33315

(*) Notice: Subject to any disclaimer, the term of this patent is extended or adjusted under 35 U.S.C. 154(b) by 155 days.

(21) Appl. No.: 10/057,123

(22) Filed: Jan. 28, 2002

(65) Prior Publication Data

US 2003/0140834 A1 Jul. 31, 2003

(51) Int. Cl.[7] .............................. B63B 1/20; B63B 1/38
(52) U.S. Cl. ...................... 114/67 A; 114/289; 114/290
(58) Field of Search ..................... 114/67 A, 288–290

(56) References Cited

U.S. PATENT DOCUMENTS

| 3,893,406 A | 7/1975 | Kermit, II |
|---|---|---|
| 4,890,564 A | 1/1990 | Burg |
| 5,000,107 A | 3/1991 | Burg |
| 5,611,294 A | 3/1997 | Burg |
| 5,746,146 A | 5/1998 | Bixel, Jr. |
| 5,850,793 A | 12/1998 | Bronson |

*Primary Examiner*—Sherman Basinger
(74) *Attorney, Agent, or Firm*—Oltman, Flynn & Kubler

(57) ABSTRACT

A monohull marine platform is provided which includes a plurality of bows each having a flat lower keel. A transverse stern seal is connected to the bows using an inclined lift surface and a pair of outboard seals forming an air chamber. Pressurized air is forced into the air chamber to form a pressurized air cushion under the platform. Respective water flow channels disposed between each pair of the plurality of bows diminish wave energy during operation. As the platform passes through the water, the platform utilizes a combination of flotation, pneumatic, and hydrodynamic for reduced resistant and drag.

19 Claims, 7 Drawing Sheets

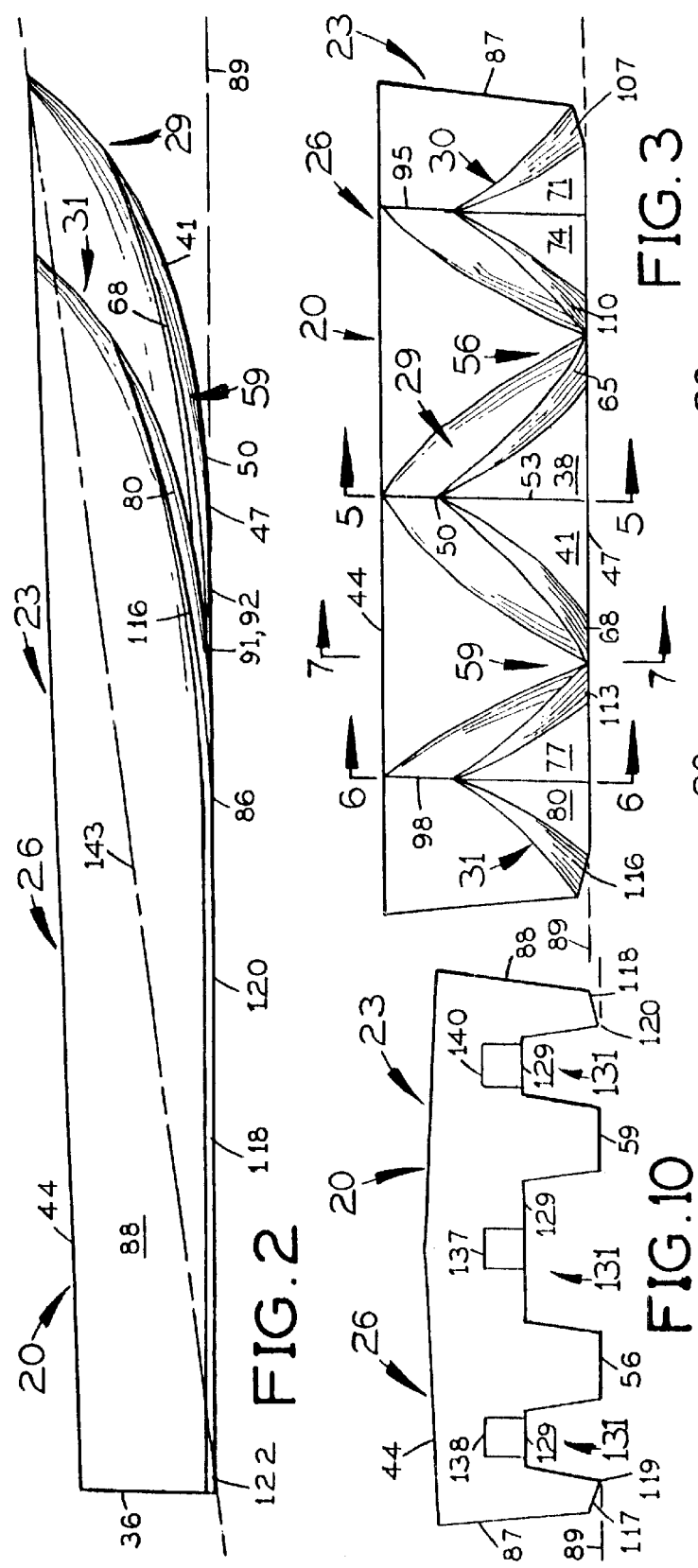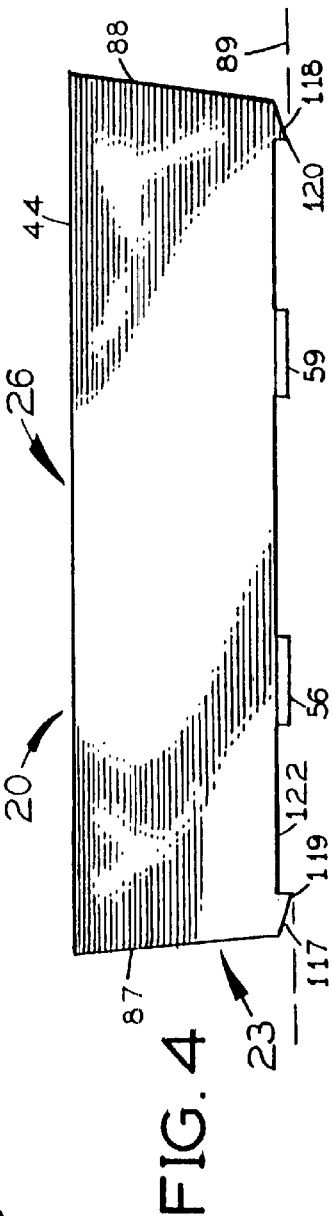

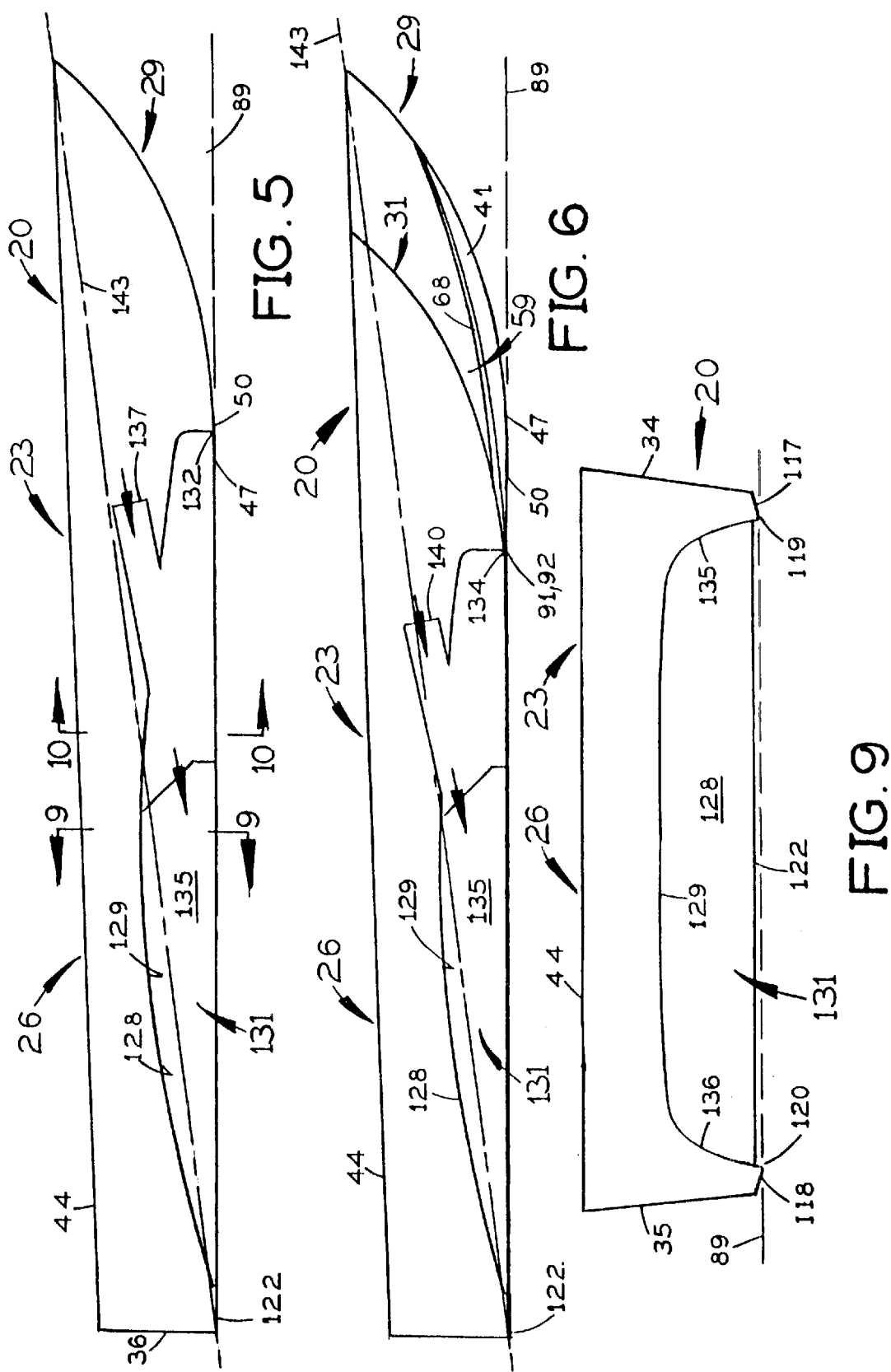

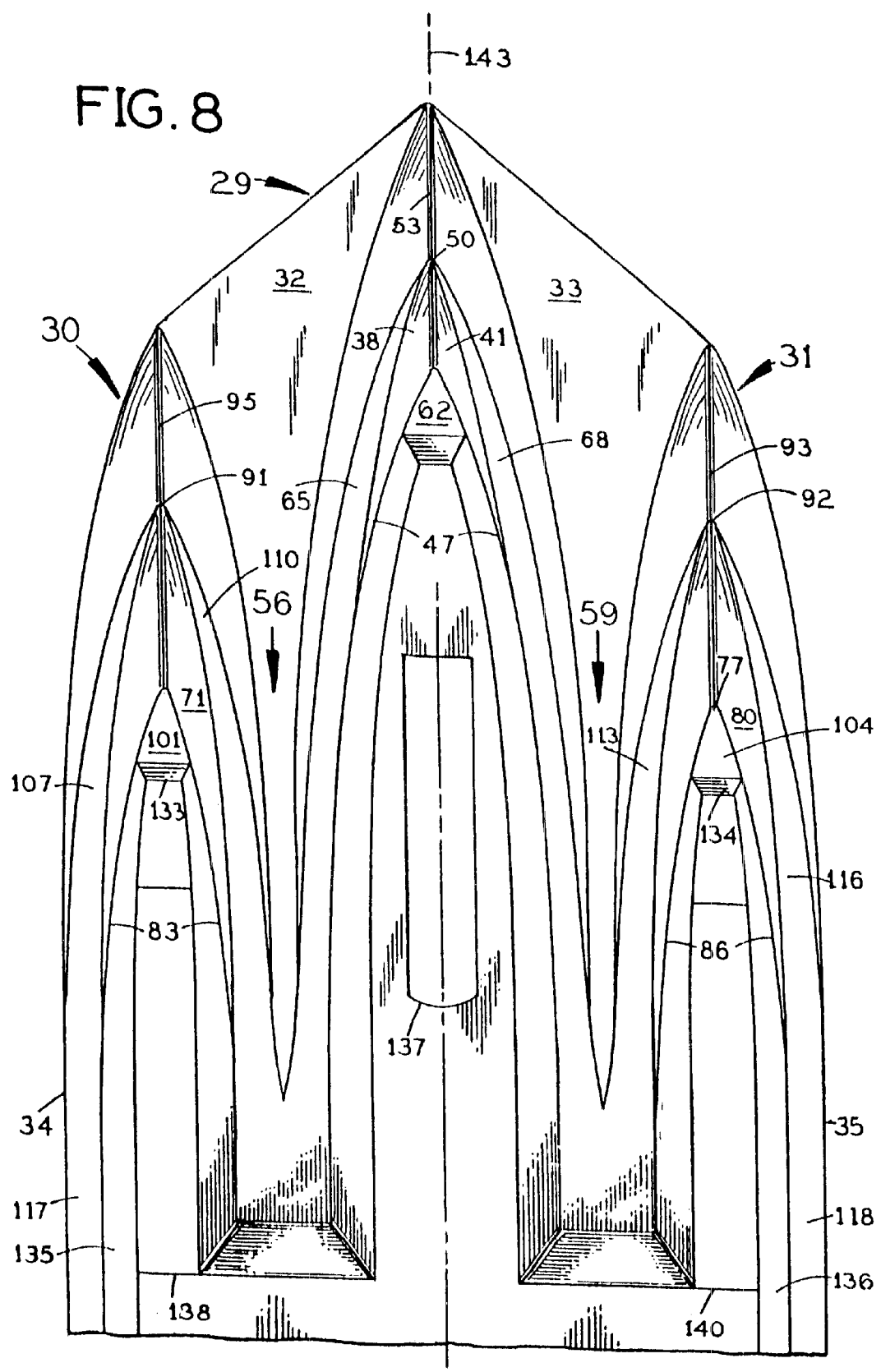

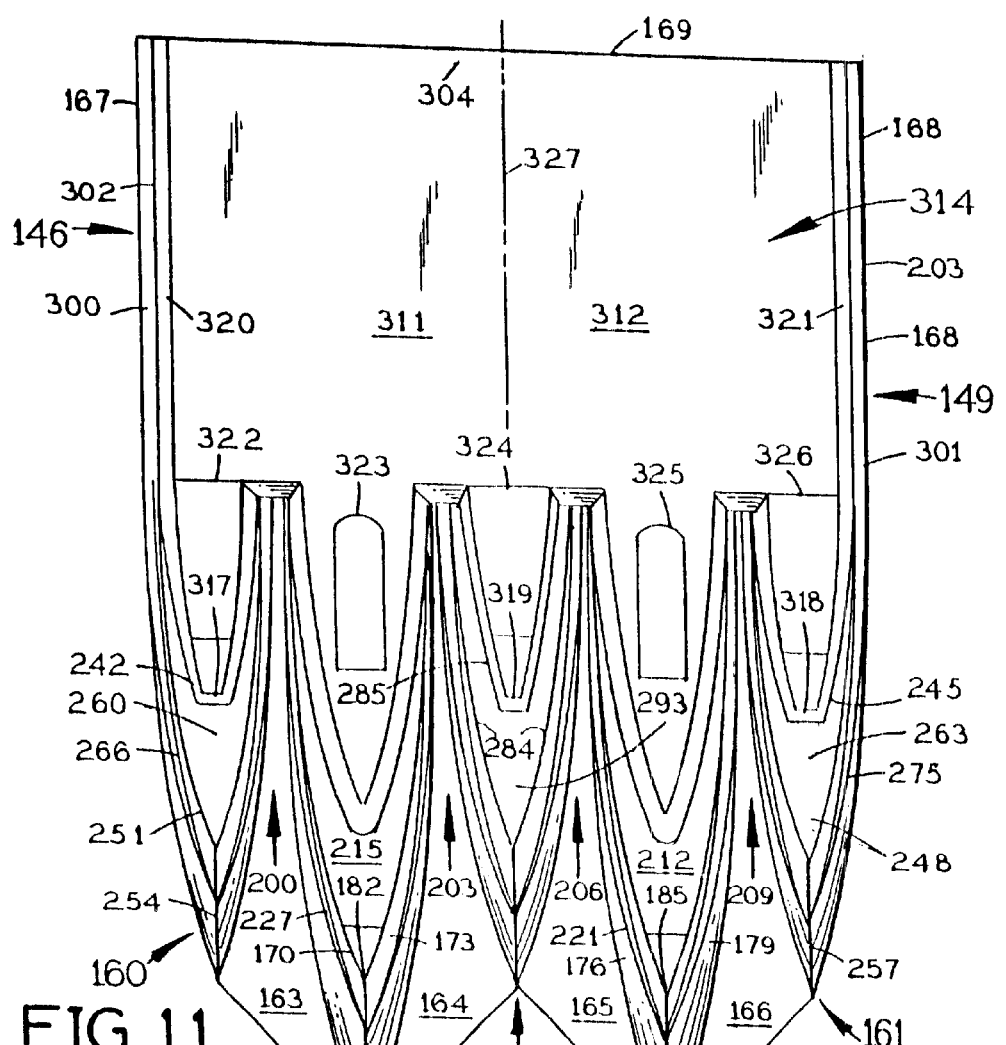
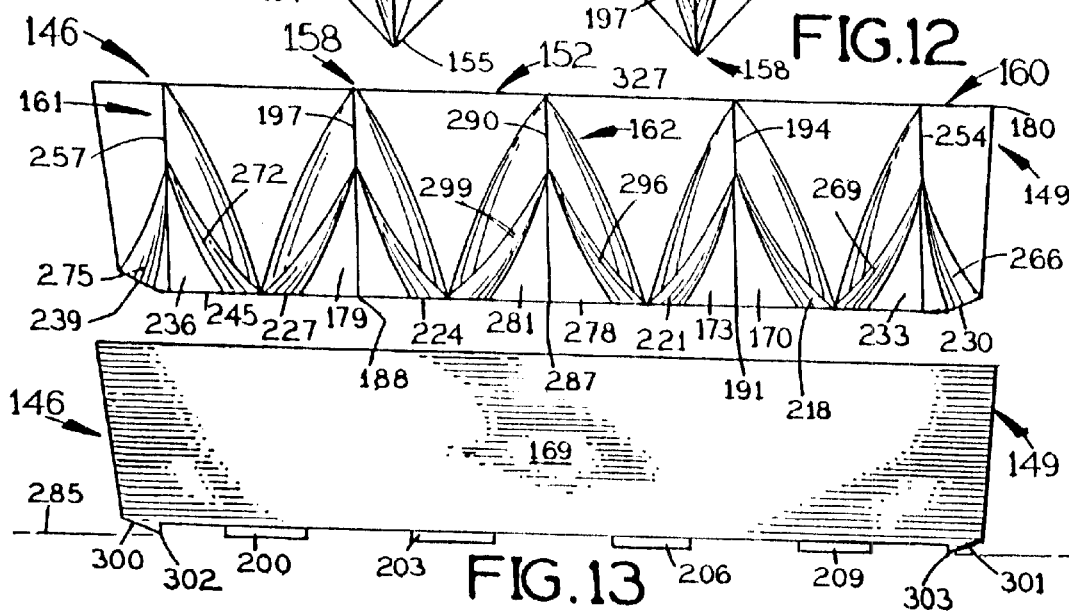

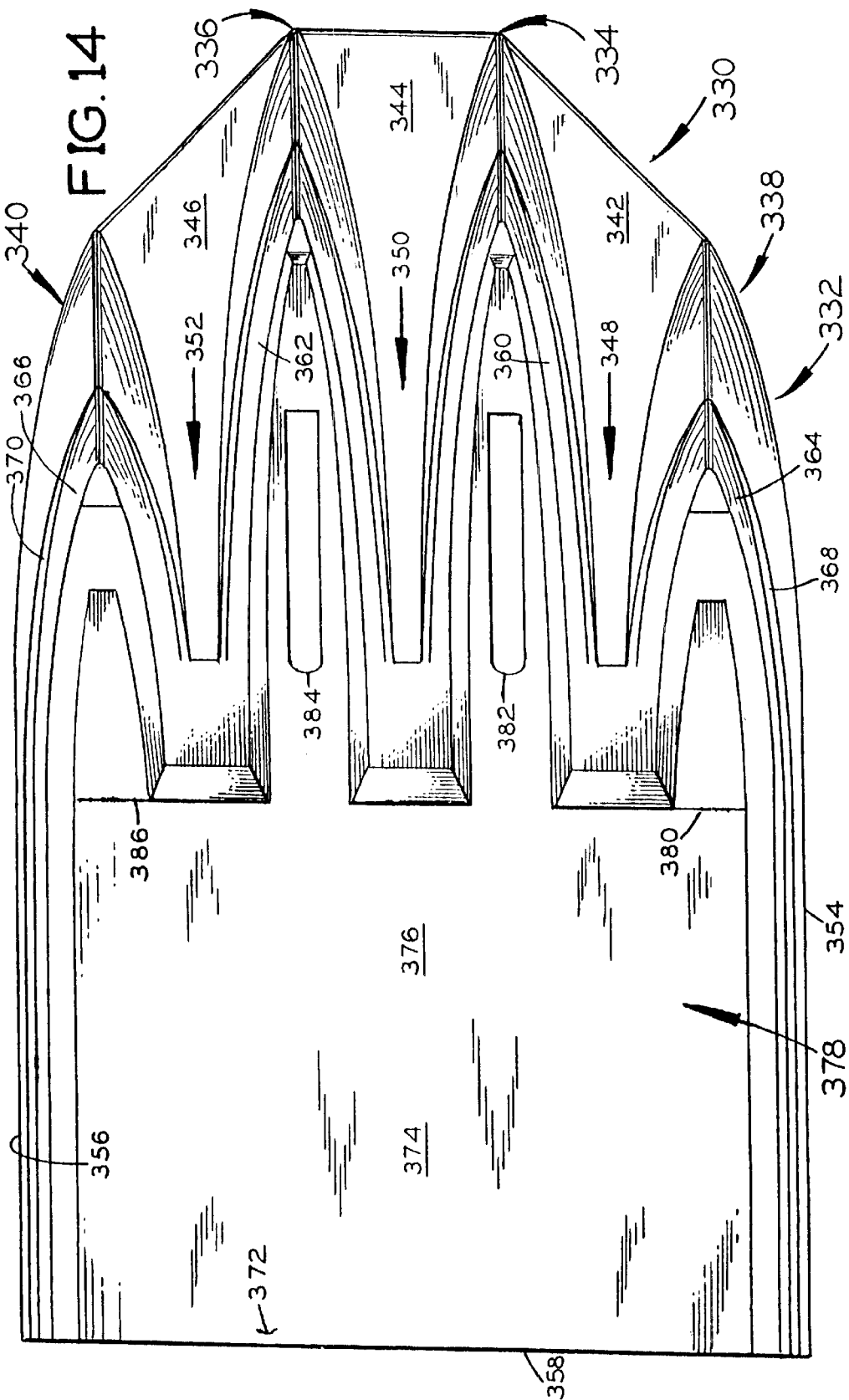

INTEGRATED ENTRY AIR CUSHION MARINE VESSEL AND MARINE PLATFORM

BACKGROUND OF THE INVENTION

1. Field of the Invention

The present invention relates generally to the field of marine surface vessels. More specifically the present invention relates to a surface operating marine vessel which is supported by a cushion of pressurized air supplied to the air cushion by blowers.

2. Description of the Prior Art

There have been many types of marine surface vessels, some of which have utilized a cushion of pressurized gas such as air to reduce friction with the surface of the water. Some such marine vessels operate in a surface effect condition by entrapping a cushion(s) of artificially pressurized air between the vessel and the surface of the water such as by utilizing a plurality of blowers which fill a flexible skirt at the bottom of the vessel. Others use a ram effect of ambient air that is sandwiched between the vessel water surface when the vessel is travelling at higher speeds. The first type of vessel are called hovercrafts or Surface Effect Ships (SES's), and the latter are called Wing In Ground Effect (WIG), Wing In Surface Effect Craft, or more simply wingships. Other vessels use a combination of blowers and ram effect to provide a pressurized air cushion below the vessel. The common denominator to all of these vessels is that pressurized air is disposed between the vessel and the surface of the water supports the majority of the vessel weight. The operating efficiency of SES vessels is much greater than that of conventional marine vessels.

A vessel which utilizes blowers to create an air cushion in a pair of lower recesses is disclosed in Burg U.S. Pat. No. 4,890,564 issued on Jan. 2, 1990. Burg teaches a marine surface vessel that includes a center bow and side hulls that is supported, at least in part, by a cushion of pressurized air supplied by a powered blower. The pressurized gas cushion is restrained within a pair of longitudinally extending recesses built into the underside of the hull separated by a parallel center divider. The recesses are closed at respective bow ends of the hull by respective forward movable seals that increase movable seal life. The recesses are closed at respective stem ends by respective movable stem seals that allow control of the depth of the air cushion, the pressure of the air cushion, and other air cushion characteristics. Water impact relief openings extend through the side hulls disperse wave impact energy through the side hulls. The center bow terminates forward of the flexible seal. However, flexible seals are subject to impact damage, fatigue, and wear. In rough seas, they dramatically add to the resistance and drag of the boat, thus slowing the boat down.

A vessel which utilizes a compressor to create an air cushion in a lower recess covered by a plurality of louvers arranged to vent pressurized air downwardly and rearwardly is revealed in Burgin U.S. Pat. No. 3,893,406 issued on Jul. 8, 1975. Burgin teaches a boat having a bottom, twin longitudinal depending keels adjacent the lateral edges of the bottom, extending the length of the bottom. Each keel includes a longitudinally extending passageway having an intake port at the bow end and an exhaust port adjacent at the stem end. An engine drives a respective water jet pump disposed in each passageway to draw water through the respective intake port and force the water out under pressure through the respective exhaust port. The engine drives a pair of rotary beaters at the respective intakes that keep trash out of the intake ports. The bottom of the boat is formed with a recess having a closed top, sides, and ends. An compressor driven by the engine delivers a flow of pressurized air into the recess. A plurality of louvers cover the recess, being arranged to vent the pressurized air downwardly and rearwardly to lubricate the hull moving through the water. A center bow reaches forwardly beyond the keels terminating at a forward end of the recess. The keels project downwardly and are lower than the forward seal and the level of air in the well. However, since the keel line of the boat extends downward with the keel being lower than the bow, the pressurized air in the air cavity escapes out of the front thereof being the highest point of the air cavity. The keels create significant drag.

A multi-hull "surface effect ship" (SES) vessel that combines with a "wing in ground effect boat" (WIG) is disclosed in Burg U.S. Pat. No. 5,611,294 issued on Mar. 18, 1997. Burg teaches a multi-hull gas cushion supported marine vessel that is capable of transition to airborne surface effect operation. The vessel has three elongate hulls having respective knife shaped bows that slice into waves. Each hull includes a lower recess having a very fine entry and low angle of side wall divergence containing a respective pressurized air cushion. The sidehulls include outer water rejecting steps that extend high onto the sidehulls, and retractable water stabilizers in the form of inverted-T hydrofoils for increased stability in heavy seas. Respective inverted-V shaped, gas cushion and wetdeck aft seals are provided to ensure minimum effect of wave impacts in those areas. The recesses are supplied with pressurized air by a respective powered blower with the recesses being sealable using a respective sealing flap. Each recess can be maintained at a positive pressure for maximum draft or at a negative pressure relative to ambient for a minimum above water profile such as for patrol boat applications where a minimum radar signature is desired. Connecting ducts with venturies interconnect the recesses to dampen pressure differences between the recesses and to supply pressurized air to a recess should the respective blower fail (the respective sealing flap being closed) to permit continued vessel operation until repairs can be made. The vessel can include a pair of retractable or fixed sidewings to add aerodynamic lift when the vessel is airborne. The sidewings may include outrigger hulls for added stability. However, the SES capabilities of this boat design will not lift any more than boat and crew, it will not carry a payload due to the limitations of SES designs. There is not enough square feet of air cushion, and far too much drag from the hulls and tunnels of the design in operation to even gain the benefits of WIG technology. The WIG technology has the same limitation as the SES of not being able to carry a payload. The combination of both is a highly technical design, expensive to build, expensive to operate, and expensive to maintain.

A vessel which utilizes blowers to create an air cushion in a pair of lower recesses is disclosed in Burg U.S. Pat. No. 5,000,107 issued on Mar. 19, 1991. This is a continuation in-part of U.S. Pat. No. 4,890,564 issued to Burg. The improvements over the previous design is the pressurized air cushions are restrained by modified recesses of the hull and by a plurality of movable forward seals such that some eighty to ninety percent of vessel weight is supported by the pressurized air cushions resulting in greater hull efficiency. The plurality of forward seals are placed in the pressurized air cushion so as to divide its functions. Differential air cushion portion pressures provide an improved ride for passengers. Zero or low angle to horizontal surfaces on sidehull forward lower and aft seal lower surfaces ensures good pressurized air sealing and better hull efficiency. The aft seal angled surfaces and forwardly extending bow also provide better ride qualities. The aft movable seal members are controllable to change the orientation of the hull using the pressurized air cushions. A narrower hull beam forward than aft which results in more attractive and easier riding bow sections. However, the boat is an improvement on the previous patent but has thee same inherent limitations.

A "Surface Effect Ship" (SES, twin hard sidewalls) cargo vessel with flat bottom planing pontoons (SEPPS) which utilizes a hovercraft type lift system and is claimed to be capable of operating at two to three times the speeds of conventional cargo vessels having the same horse power to weight ratios is disclosed in Bixel, Jr. U.S. Pat. No. 5,746, 146 issued on May 5, 1998. Bixel, Jr. teaches a "zero draft" cargo vessel with high speed open sea operational capabilities. The vessel is a catamaran type design which incorporates a hovercraft blower system capable of lifting the craft slightly out of the water with air escaping from the pressurized air cushion lubricating respective bottoms of the pontoon while planing for reduced water drag. A soft hovercraft air pad is contained within and stabilized by the pontoons. However, the boat is an SES design claiming to operate at the resistance of a hovercraft. A hovercraft is a highly inefficient vehicle. The design will never achieve the necessary speed and efficiency in operation as a loaded cargo vessel. The high speed planning surfaces will not offer enough flotation by themselves to float the boat as a shallow draft vessel. If they were big enough to float a cargo/load bearing vessel, the resulting drag in operation would be immense and the force of vertical impacts of the planning surface would crush the cargo. Additionally, the forward seal is so blunt that it will stop the boat in any seas beyond a light chop.

A race boat which utilizes aerated hydrochannels along the length of the boat to adjust the attitude of the hull is disclosed in Bronson U.S. Pat. No. 5,850,793 issued on Dec. 22, 1998. Bronson teaches a tri-hull vessel using air and water collectively channeled and controlled through its design to enhance speed and stability through the water. A pair of structural wings connect the outer hulls to the center hull and include respective flaps are adjustable to direct the flow of ambient air in the desired direction and into a pair of air intake. The which enters the air intakes passes through a respective air channel in each outer hull and exits into a respective hydrochannel formed in at the bottom of each outer hull. The exiting air on the water moving through each hydrochannel provides an upward force to the rear of each outboard hull resulting in a downward force to the bow of the tri-hull which enhances stability at high speeds. Adjustable air flow relief valves are provided for controlling the flow of air into hydro-channels and subfins beneath each outer hull provide traction during turns. However, the boat utilizes aerated hydrochannels which extend the length of the boat which are for stabilization and attitude control of the boat during racing. The hydrochannels raise the stem and lower the bow. This application is not for cargo vessels.

It is thus an object of the present invention to provide an integrated entry surface effect marine platform for powered and unpowered marine vessels and barges which has reduced drag through water.

It is another object of the present invention to provide an integrated entry surface effect marine platform which has superior wave penetration for rough sea operation.

It is a still further object of the present invention to provide an integrated entry surface effect marine platform of a monohull design.

It is still another object of the present invention to provide such an integrated entry surface effect marine platform which utilizes pressurized air to reduce friction with the water.

It is finally an object of the present invention to provide such an integrated entry surface effect marine platform which is supported in forward operation by a combination of floatation, pneumatic lift, and hydrodynamic lift

SUMMARY OF THE INVENTION

The present invention accomplishes the above-stated objectives, as well as others, as may be determined by a fair reading and interpretation of the entire specification.

An integrated entry surface effect marine platform is provided including 1) a plurality of bows each including respective pairs of bow inclines that begin at an upper shear line and continue down and aft, respective outboard most of the bow inclines which extend aft and outboard to a transverse a stem seal forming respective outboard seals therealong; 2) a plurality of water flow channels, one channel being disposed between each pair of the plurality of bows; 3) a keel for each bow, the keels originating at respective bases of the bows and continuing aft and outboard from respective center lines of the bows; 4) a plurality of bow seals that originate at respective bases of the bows at respective forward ends of the keels and continue aft and outboard along respective of the keels until the keels blend into the water flow channels and the outboard seals; 5) an aft inclined lift surface that precedes the stem seal extending forward to an upper air cavity surface which extends into the respective water flow channels forming an air cavity thereunder, the air cavity originating at the bow seals, at the bases of the bows, at respective forward ends of the keels, the air cavity which continues aft and outboard along respective of the keels until blending into the water flow channels and the outboard seals; 6) at least one air discharge duct through top of the air cavity lift through which the pressurized air is delivered to the air cavity, and 7) wherein as the marine platform passes through the water, the aft inclined lift surface provides hydrodynamic lift to raise an aft end of the marine platform, the air cavity being filled with a flow of pressurized air from the air discharge ducts, the air cavity which restrains a cushion of pressurized air beneath the marine platform in operation to reduce water contact therewith to reduce laminar friction, the water flow channels which direct flows of displaced water from wave impacts into the air cavity wherein the air cushion and flow of pressurized air maintain the reduced contact with the water for reduced resistance and drag.

BRIEF DESCRIPTION OF THE DRAWINGS

Various other objects, advantages, and features of the invention will become apparent to those skilled in the art from the following discussion taken in conjunction with the following drawings, in which:

FIG. 2 is a side elevational view of the power boat.

FIG. 3 is a front elevational view of the power boat.

FIG. 4 is a rear elevational view of the power boat.

FIG. 5 is a longitudinal vertical sectional view of the power boat taken on the line 5—5 of FIG. 3.

FIG. 6 is a longitudinal vertical sectional view of the power boat taken on the line 6—6 of FIG. 3.

FIG. 8 is a fragmentary top plan view of the power boat.

FIG. 9 is a lateral vertical sectional of the power boat view taken on the line 9—9 of FIG. 5.

FIG. 10 is a lateral vertical sectional view of the power boat taken on the line 10—10 of FIG. 5.

FIG. 11 is a bottom plan view of the second preferred integrated entry air cushion marine vessel and marine platform in the form of a non-powered barge.

FIG. 12 is a front elevational view of the non-powered barge.

FIG. 13 is a rear elevational view of the non-powered barge.

FIG. 14 is a top plan view of a the third preferred integrated air cushion marine vessel and marine platform in the form of a powered boat or non-powdered barge.

DETAILED DESCRIPTION OF THE PREFERRED EMBODIMENTS

Figure 1:
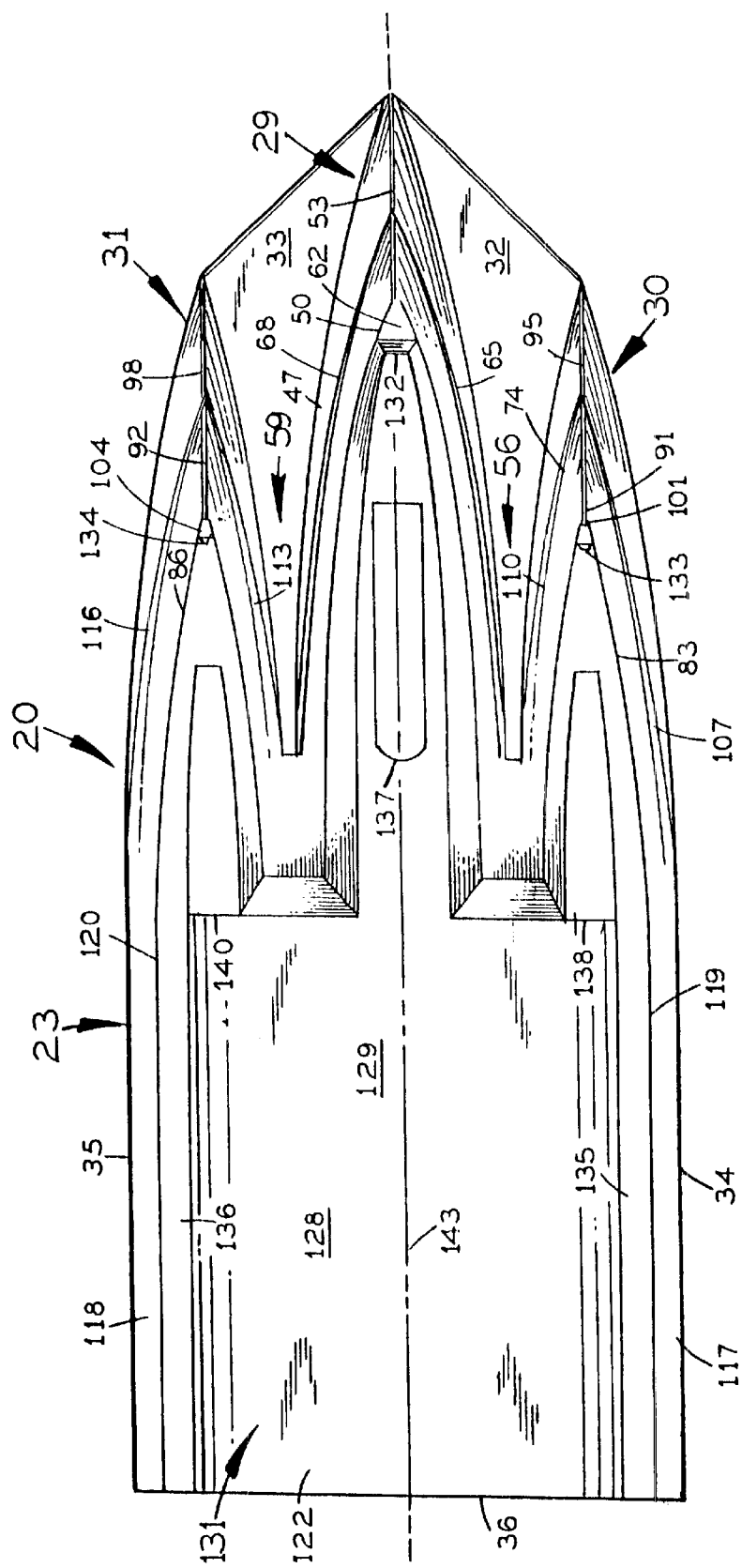
FIG. 1 is a bottom plan view of the first preferred integrated entry air cushion marine vessel and marine platform the form of a power boat.
Figure 7:
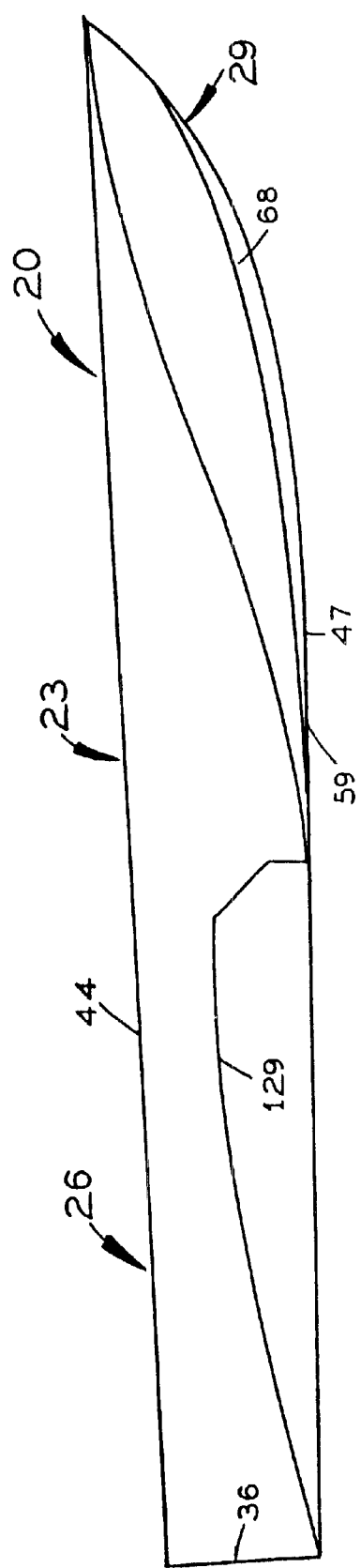
FIG. 7 is a longitudinal vertical sectional view of the power boat taken on the line 7—7 of FIG. 3.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–10, a first preferred integrated entry air cushion marine vessel and marine platform preferably in the form of a power boat is disclosed.

FIG. 1 includes a power boat 20 having a hull 23 of a monohull design and a top deck 26. The hull 23 includes a plurality of entries or bows (hereinafter referred to as "bows") in the form of a center or main bow 29 and a pair of side or outboard bows 30 and 31 which are interconnected by a pair of bow connecting pieces 32 and 33. A pair of side walls 34 and 35 extend aft along the outboard bows 30 and 31 to a transom 36. The bows 29, 30, and 31 are staggered to aid in breaking up the wake formed when moving through water.

A pair of main bow inclines 38 and 41 of the main bow 29 begin at a shear line 44 disposed between the hull 23 and the top deck 26 and continue down and aft to a main keel 47. The main keel 47 is flat, originating at a base 50 of the main bow 29 and continuing aft and outboard from a center line 53 of the main bow 29, blend and widen into respective water flow vents or channels 56 and 59 outboard of the main bow 29 and inboard of the outboard bows 30 and 31. The main keel 47 includes a triangular shaped forward floatation and hydrodynamic lift surface 62. A pair of main chines 65 and 68 originate at the main bow inclines 38 and 41 at the centerline 53 of the main bow 29 which blend and widen down to the respective water flow channels 56 and 59. The main chines 65 and 68 are inclined upwardly on main bow 29 to reduce vertical impact forces. The main chines 65 and 68 also aid the main bow 29 in creating hydrodynamic lift and support for the bow main bow 29 including in following sea conditions.

Respective pairs of outboard bow inclines 71 and 74, and 77 and 80 of the outboard bows 30 and 31 begin at the shear line 44 and continue down and aft to respective outboard keels 83 and 86. The outboard keels 83 and 86 are flat, which along with the main keel 47 are a lowermost part of the power boat 20, defining a planar surface or keel line 89, and functioning as a forward and outboard seal. The outboard keels 83 and 86 originate at respective bases 91 and 92 of the outboard bows 30 and 31 and continue aft and outboard from respective centerlines 95 and 98 of the outboard bows 30 and 31, blend and widen into the outboard inclined lift surfaces 117 and 118 on the outboard side of the outboard bows 30 and 31, and also extend aft and inwardly from the respective centerlines 95 and 98 of the outboard bows 30 and 31, blend and widen into the respective water flow channels 56 and 59 inboard of the outboard bows 30 and 31 and on both sides of the main bow 29. The outboard keels 83 and 86 include respective triangular shaped forward floatation and hydrodynamic lift surfaces 101 and 104. Respective pairs of outboard chines 107 and 110, and 113 and 116 originate at the respective pairs of outboard bow inclines 71, 74, 77, and 80 at the respective centerlines 95 and 98 of the outboard bows 30 and 31. On the outboard sides of the outboard bows 30 and 31, the chines 4107 and 116 extend aft to form outboard inclined lift surfaces 117 and 118, with the respective outboard keels 83 and 86 at the base of the outboard inclined lift surfaces 117 and 118 forming lower seals 119 and 120 at the keel line 89. On the inboard side of the outboard bows 30 and 31, the chines 110 and 113 blend and widen down to the water flow channels 56 and 59. The pairs of outboard chines 107 and 110, and 113 and 116 are inclined upwardly on the respective outboard bows 30 and 31 to reduce the force of vertical impacts. The pairs of outboard chines 107 and 110, and 113 and 116 also aid the respective outboard bows 30 and 31 in creating hydrodynamic lift and support for the outboard bows 30 and 31 including in following sea conditions.

The outboard bow inclines 71 and 80 extend aft and outboard to a transverse aft or stern seal 122. An aft inclined flotation or hydrodynamic lift surface 128 precedes the stern seal 122 extending forward to a more horizontally disposed upper surface 129 which extends forward into the respective main bow 29 and outboard bows 30 and 31 forming an air cavity 131 thereunder. The air cavity 131 is a compartment that is filled with a flow of compressed, pressurized air from one or more compressors or blowers (not shown). Respective forward or bow seals 132, 133, and 134 originate at the respective bases 50, 91, and 92 of the main and outboard bows 29, 30, and 31 at the forward end of the main keel 47 and the outboard keels 80 and 81 and continue aft and outboard along the main and outboard keels 47, 83, and 86 until the keels 47, 83, and 86 blend into the outboard seals 119 and 120 and the water flow channels 56 and 59. The air cavity 131 originates at the forward bow seals 132, 133, and 134 at the forward lift surface 62 of the main keel 47 and the forward lift surfaces 101 and 104 of the outboard keels 83 and 86, at the respective bases 50, 91, and 92 of the main and outboard bows 29, 30, and 31 at the forward end of the main and outboard keels 47, 83, and 86. The air cavity 131 continues aft and outboard along the main and outboard keels 47, 83, and 86 until they blend into the outboard seals 119 and 120 and the water flow channels 56 and 59. Respective side walls 135 and 136 of the air cavity 131 are inclined inwardly to provide maximum hull flotation. The incline of the side walls 135 and 136 gradually transitions to horizontally flat as it blends into the stern seal 122. The aft inclined lift surface 128 provides flotation for the hull 23 and provides hydrodynamic lift to raise the aft end of the power boat 20 when underway, reducing the wetted surface area and the resulting resistance or drag. The aft inclined lift surface 128 also reduces the impact of water and waves in the air cavity 131. A plurality of air discharge ducts 137, 138, and 140 deliver air from respective blowers (not shown) into the air cavity 131. The power boat 20 is propelled along a thrust line 143 that originates at the stern seal 122 and proceeds forward through the main bow 29 to the shear line 44.

The power boat 20 is supported in static (non-moving) operation by flotation in the water. The power boat 20 is supported in dynamic (moving) operation by hydrodynamic lift provided by the main bow 29, the outboard bows 30 and 31, the water flow channels 56 and 59, the forward lift surfaces 62, 101, and 104, the outboard seals 119 and 120, the aft inclined lift surface 128, the forward bow seals 132, 133, and 134, the outboard seals 119 and 120, and the stern seal 122.

As the hull 23 passes through the water, the air cavity 131 is filled with a flow of air from the discharge ducts 137, 138, and 140 which deliver a flow of compressed, pressurized air from the blowers. The flow rate and thus the pressure of the air within the air cavity 131 is controlled by adjusting the speed of the blowers or by using respective valves (not shown) which regulate the flow of pressurized air into the air cavity 131. When the air cavity 131 is pressurized, it supports the majority of the weight of the power boat 20. The stern seal 122 creates a physical seal between the pressurized air within the air cavity 131 and the water at the aft end of the power boat 20. The aft inclined lift surface 128 provides hydrodynamic lift to raise the aft end of the power boat 20 when underway, reducing the wetted surface area and the resulting resistance and drag. The aft inclined lift surface 128 reduces the impact of water and waves in the air cavity 131. Pressurized air is released from the forward bow seals 132, 133, and 134, and the outboard seals 119 and 120 which aerates the water, lubricating the wetted surface area of the boat including the main and outboard bows 29, 30, and 31, the water flow channels 56 and 59, and the outboard inclined lift surfaces 117 and 118 from the effects of laminar friction by the water. The stem seal 122 may be level with the main and outboard keels 47, 83, and 86 and the outboard seals 119 and 120 at the keel line 89, or may be slightly raised therefrom so as to induce a large flow of pressurized air and aerated water to flow by the stem seal 122 lubricating the stem end of the power boat 20. The water flow channels 56 and 59 incline downwardly toward the front of the power boat 20 and are flat toward the rear thereof to create flotation and hydrodynamic lift during operation. In the event of an emergency stop the power boat 20 decelerates quickly if the air cushion is depressurized.

The water flow channels 56 and 59 direct and channel the displaced water and energy encountered by wave impacts into the air cavity 131. The wave impact energy is diffused in the air cavity 131 by the exerted pressurized air flow, which also causes a separation between the water and the hull 23. The inclined disposition of the outboard inclined lift surfaces 117 and 118 further reduces the force of vertical impacts as the hull encounters wave impacts.

A typical power boat 20 would have three bows 29, 30, and 31 as illustrated, but may have another number of bows, typically more. The number of bows can be an even or odd number, though preferably an odd number and staggered fore to aft as shown to create a more streamlined design. The forward most point of the main bow 29 and outboard bows 30 and 31 may or may not be staggered fore to aft as illustrated. The outboard bows 30 and 31 may be positioned aft of the main bow 29 as illustrated, or in-line, or forward of the main bow 29. The main bow 29 may or may not be wider than the outboard bows 30 and 31. The main, outboard, and intermediate bows 29, 30, and 31 are preferably sharply designed to penetrate waves in an efficient manner to reduce impact and drag.

Second Preferred Embodiment Referring to FIGS. 11–13, a second preferred integrated entry air cushion marine vessel and marine platform preferably in the form of a non-powered barge is disclosed.

FIG. 11 includes a non-powered barge 146 having a hull 149 of a monohull design and a top deck 152. The hull 149 includes a plurality of bows in the form of a pair of main bows 155 and 158, a pair of outboard bows 160 and 161, and an intermediate bow 162 which are interconnected by a plurality of bow connecting pieces 163, 164, 165 and 166. A pair of side walls 167 and 168 extend aft along the outboard bows 160 and 161 to a transom 169. The bows 155, 158, 160, 161 and 162 are staggered to aid in breaking up the wake formed when moving through water.

Two pairs of main bow inclines 170 and 173, and 176 and 179 of the respective main bows 155 and 158 begin at a shear line 180 disposed between the hull 149 and the top deck 152 and continue down and aft to respective main keels 182 and 185. The main keels 182 and 185 are flat, originating at respective bases 188 and 191 of the main bows 155 and 158 and continuing aft and outboard from respective center lines 194 and 197 of the main bows 155 and 158, blend and widen into respective pairs of water flow channels 200 and 203, and 206 and 209 outboard of the respective main bows 155 and 158 and the intermediate bow 162, inboard of the outboard bows 160 and 161. The main keels 182 and 185 include triangular shaped forward floatation and hydrodynamic lift surfaces 212 and 215. Two pairs of main chines 218 and 221, and 224 and 227 originate at the respective pairs of main bow inclines 170 and 173, and 176 and 179 at the respective centerlines 194 and 197 of the main bows 155 and 158 which blend and widen down to the respective pairs of water flow channels 200 and 203, and 206 and 209 outboard of the respective main bows 155 and 158 and the intermediate bow 162, inboard of the outboard bows 160 and 161. The pairs of main chines 218 and 221, and 224 and 227 are inclined upwardly on the respective main bows 155 and 158 to reduce the force of vertical impacts. The pairs of main chines 218 and 221, and 224 and 227 also aid the respective main bows 155 and 158 in creating hydrodynamic lift and support for the main bows 155 and 158 including in following sea conditions.

Respective pairs of outboard bow inclines 230 and 233, and 236 and 239 of the outboard bows 160 and 161 begin at the shear line 180 and continue down and aft to respective outboard keels 242 and 245. The outboard keels 242 and 245 are flat. The outboard keels 242 and 245 originate at respective bases 248 and 251 of the outboard bows 160 and 161 and continue aft and outboard from respective centerlines 254 and 257 of the outboard bows 160 and 161, blend and widen into respective outboard inclined lift surfaces 300 and 301 on the outboard side of the outboard bows 160 and 161, and also extend aft and inwardly from the respective centerlines 254 and 257 of the outboard bows 160 and 161, blend and widen into the respective water flow channels 200 and 209 inboard of the outboard bows 160 and 161 on respective outboard sides of the main bows 155 and 158. The outboard keels 242 and 245 include respective triangular shaped forward floatation and hydrodynamic lift surfaces 260 and 263. Respective pairs of outboard chines 266 and 269, and 272 and 275 originate at the respective pairs of outboard bow inclines 230 and 233, and 236 and 239 at the respective centerlines 254 and 257 of the outboard bows 160 and 161. On the outboard sides of the outboard bows 160 and 161, the chines 266 and 275 extend aft to form the outboard inclined lift surfaces 300 and 301, with the respective outboard keels 242 and 245 at the base of the outboard inclined lift surfaces 300 and 301 forming outboard seals 302 and 303 at the keel line 285. On the inboard side of the outboard bows 160 and 161, the chines 269 and 272 blend and widen down to the water flow channels 200 and 209. The pairs of outboard chines 266 and 269, and 272 and 275 are inclined upwardly on the respective outboard bows 160 and 161 to reduce the force of vertical impacts. The pairs of outboard chines 266 and 269, and 272 and 275 also aid the respective outboard bows 160 and 161 in creating hydrodynamic lift and support for the outboard bows 160 and 161 including in following sea conditions.

A pair of intermediate bow inclines 278 and 281 of the intermediate bow 162 begin at the shear line 180 and continue down and aft to an intermediate keel 284. The intermediate keel 284 is flat, which along with the outboard keels 242 and 245 are a lowermost part of the barge 146, defining a planar surface or keel line 285, and functioning as a forward and outboard seal. The intermediate keel 284 originates at a base 287 of the intermediate bow 162 and continues aft and outboard from a centerline 290 of the intermediate bow 162, blending into the respective water flow channels 203 and 206 inboard of the main bows 155 and 158 on respective outboard sides of the main bows 155 and 158. The intermediate keel 284 includes a triangular shaped forward floatation and hydrodynamic lift surface 293. A pair of intermediate chines 296 and 299 originate at the pair of intermediate bow inclines 278 and 281 at the centerline 290 of the intermediate bow 162. On the outboard sides of the intermediate bow 162, the chines 296 and 299 extend aft and blend into the respective water flow channels 203 and 206. The intermediate chines 296 and 299 are inclined upwardly on the intermediate bow 162 to reduce the force of vertical impacts. The intermediate chines 296 and 299 also aid the intermediate bow 162 in creating hydrodynamic lift and support for the intermediate bow 162 including in following sea conditions.

The outboard bow inclines 230 and 239 of the outboard bows 160 and 161 extend aft and outboard to a transverse aft or stem seal 304. An aft inclined flotation or hydrodynamic lift surface 311 precedes the stem seal 304 extending forward to a more horizontally disposed upper surface 312 which extends forward into the respective water flow channels 200, 203, 206, and 209 forming an air cavity 314 there-under. Respective forward or bow seals 315, 316, 317, 318, and 319 originate at the respective bases 188, 191, 248, 251, and 287 of the main, outboard, and intermediate bows 155, 158, 160, 161, and 162 at the forward end of the main keels 182 and 185, the outboard keels 242 and 245, and the intermediate keel 284 and continue aft and outboard along the main, outboard, and intermediate keels 182, 185, 242, 245, and 284 until the keels 182, 185, 242, 245, and 284 blend into the outboard inclined lift surfaces 230 and 239, and the water flow channels 200, 203, 206, and 209. The air cavity 314 originates at the forward bow seals 315, 316, 317, 318, and 319 at the forward lift surfaces 212 and 215 of the main keels 182 and 185, forward lift surfaces 260, 263 of the outboard keels 242 and 245, and forward lift surface 293 of the intermediate keel 284 at the respective bases 188 and 191 of the main bows 155 and 158, bases 248 and 251 of the outboard bows 160 and 161, and base 287 of the intermediate bow 162 at the forward end of the main keels 182 and 185, the outboard keels 242 and 245, and the intermediate keel 284. The air cavity 314 continues aft and outboard along the main, outboard, and intermediate keels 182, 185, 242, 245, and 284 until they blend into the outboard seals 302 and 303, and the water flow channels 200 and 209. Respective side walls 320 and 321 of the air cavity 314 are inclined inwardly to provide maximum hull flotation. The incline of the side walls 320 and 321 gradually transitions to horizontally flat as it blends into the stern seal 304. The aft inclined lift surface 311 provides flotation for the hull 149 and provides hydrodynamic lift to raise the aft end of the barge 146 when underway being towed by a tug boat (not shown) or other such powered boat, reducing the wetted surface area and the resulting resistance or drag during towing. The aft inclined lift surface 311 also reduces the impact of water and waves in the air cavity 314. A plurality of air discharge ducts 322, 323, 324, 325, and 326 deliver air from respective blowers (not shown) into the air cavity 314. The barge 146 is towed along a thrust line 327 that originates at the stern seal 304 and proceeds forward through the intermediate bow 162 to the shear line 180.

The hull 149 is supported in static (non-moving) operation by flotation in the water. The hull 149 is supported in dynamic (moving) operation by hydrodynamic lift provided by the main bows 155 and 158, the outboard bows 160 and 161, and the intermediate bow 162, the water flow channels 200, 203, 206, and 209, the forward lift surfaces 212, 215, 260, 263, and 293, the aft inclined lift surface 311, the forward bow seals 315, 316, 317, 318, and 319, the outboard seals 302 and 303, and the stern seal 304.

As the barge 146 passes through the water, the air cavity 314 is filled with a flow of air from the discharge ducts 322, 323, 324, 325, and 326 which deliver a flow of compressed, pressurized air from the blowers. The flow rate and thus the pressure of the air within the air cavity 314 is controlled by regulating the speed of the blowers or by using respective valves (not shown) which regulate the flow of pressurized air into the air cavity 314. When the air cavity 314 is pressurized, it supports the majority of the weight of the barge 146. The stern seal 304 creates a physical seal between the pressurized air in the air cavity 314 and the water at the aft end of the barge 146. The aft inclined lift surface 311 provides hydrodynamic lift to raise the aft end of the barge 146 when underway, reducing the wetted surface area and the resulting resistance and drag. The aft inclined lift surface 311 reduces the impact of water and waves in the air cavity 314. Pressurized air is released from the forward bow seals 315, 316, 317, 318, and 319, and the outboard seals 302 and 303 which aerates the water, lubricating the wetted surface area of the barge 146 including the main, outboard, and intermediate bows 155, 158, 160, 161, and 162, the water flow channels 200, 203, 206, and 209, and the outboard inclined lift surfaces 300 and 301 from the effects of laminar friction by the water. The stern seal 304 may be level with the keels 182, 185, 242, 245, and 284 and the outboard seals 302 and 303 at the keel line 285, or slightly raised therefrom to induce a large flow of pressurized air and aerated water to flow by lubricating the stem end of the barge 146. The water flow channels 200, 203, 206, and 209 incline downwardly toward the front are flat toward the rear to create flotation and hydrodynamic lift in operation. In the event of an emergency stop the barge 146 decelerates quickly if the air cushion is depressurized.

The water flow channels 200, 203, 206, and 209 direct and channel the displaced water and energy encountered by wave impacts into the air cavity 314. The wave impact energy is diffused in the air cavity 314 by the exerted pressurized air flow, which also causes a separation between the water and the hull 149. The inclined disposition of the outboard inclined lift surfaces 300 and 301 reduces the force of vertical impacts as the hull 149 encounters wave impacts.

In marine platforms such as the barge 146, numerous main bows 155 and 158 may be combined with outboard bows 160 and 161, and intermediate bows 162, all separated by the water flow channels such as 322, 323, 324, 325, and 326. The number of bows can be an even or odd number, though preferably an odd number and staggered fore to aft as shown to create a more streamlined design. The barge 146 can have three bows as does the power boat 20, though preferably has more than three bows for higher cargo handling capability. The forward most point of each main bow 155 and 158, and each outboard bow 160 and 161 and intermediate bow 162 may or may not be staggered fore to aft as illustrated. The outboard bows 160 and 161 and the intermediate bow 162 may be positioned aft of the main bows 155 and 158 as illustrated, or in-line, or forward of the main bows 155 and 158. The intermediate bow 162 may or may not be shorter than the outboard bows 160 and 161. The main bows 155 and 158 may or may not be wider than the outboard bows 160 and 161 and the intermediate bow 162. The main, outboard, and intermediate bows 155, 158, 160, 161, and 162 are preferably sharply designed to penetrate waves in an efficient manner to reduce impact and drag.

Third Preferred Embodiment

Referring to FIG. 14, a third preferred integrated entry air cushion marine vessel and marine platform preferably in the form of a powered boat or non-powered barge is disclosed. The barge is of similar design to the power boat 20 and the barge 146 so only the general construction is described.

FIG. 14 includes a powered boat or non powered barge 330 having a hull 332 of a monohull design with a top deck (not shown). The hull 332 includes a pair of main bows 334 and 336, and a pair of outboard bows 338 and 340 of the construction described above, which are interconnected by a plurality of bow connecting pieces 342, 344 and 346. The main bows 334 and 336 are staggered from the outboard bows 338 and 340 to aid in breaking up the wake formed when moving through water. A plurality of water flow channels 348, 350, and 352 are disposed between the main and outboard bows 334 and 336, and 338 and 340. A pair of sidewalls 354 and 356 extend aft along the outboard bows 338 and 340 to a transom 358. A pair of flat main keels 360 and 362, and a pair of flat outboard keels 364 and 366 are a lowermost part of the barge 330, defining the keel line (not shown), and functioning as a forward and outboard seal. Respective outboard bow inclines 368 and 370 of the outboard bows 338 and 340 extend aft and outboard to a transverse stem seal 372. An aft hydrodynamic lift surface 374 precedes the stem seal 372 extending forward to a more horizontally disposed upper surface 376 which extends forward into the respective water flow channels 348, 350, and 352 forming an air cavity 378. A plurality of air discharge ducts 380, 382, 384, and 386 deliver air from respective blowers (not shown) into the air cavity 378. The barge 330 operates in the same manner as the power boat 20 and the barge 146.

The powered boat and powered or non-powered barge of the present invention represent a significant advancement in surface effect ship technology. They represent the first proper and effectual combination of floatation, pneumatic lift, hydro-dynamic lift, and wave penetration to make the surface effect ship technology economically viable. There are no soft, flexible seals to maintain and replace from wear, or which slow the boat in rough seas from their blunt entry. The present invention offers maximum performance, excellent ride quality, produces a low wake, heavy cargo can be carried due to high load bearing capacity, shallow draft capability, and is extremely economical to operate and maintain. Consequently, the present invention has great commercial and military value.

More specifically, smaller engines are needed to achieve and maintain high speeds than comparable sized boats resulting in significant fuel savings. In commercial operations where the boat is used every day, the fuel savings alone pays for the cost of the boat in about two to three years of operation. The ride quality is unsurpassed, with the large air cavity suppressing motion and reducing the force of vertical impacts. Ride control additions such as hydrofoils are not needed to lift or stabilize the boat in rough seas. A very small wake is produced because the boat and barge operate at or close to the surface of the water. This is environmentally advantageous as wake damage to shorelines, sea walls, and marine estuaries is a major problem in high speed marine transportation.

Testing and analysis of the boats and barges of the present invention versus similarly sized surface effect multihulls and catamarans of the same length and weigh solidly indicates that there is twenty-five to thirty percent less drag under ten percent heavier loaded conditions. This design offers more flotation and pneumatic lift than multihull SES and catamaran SES designs, resulting in better shallow draft operation potential. The air cavity is larger (square feet), thus supports more cargo load than may be efficiently carried by multihull and catamaran SES designs. The result is the most efficient cargo load bearing boat invented to date. Also, a safety measure, in the event of an emergency stop the boat and barge of the present invention decelerates quickly if the air flow to the air cavity is terminated.

By comparison, the applicant was co-builder and test pilot of a sixty-five foot surface effect catamaran. This boat was deficient in floatation, pneumatic, and hydrodynamic lift. After numerous modifications to the hull the performance of the catamaran improved somewhat, but it was still necessary to add two hydrofoils to the catamaran to give it enough hydrodynamic lift to carry thee normal loads of a commercial boat. The hydrofoils created considerable drag which dramatically slowed the catamaran. Considerable research has been done since then by the constructing, testing, and analyzing of numerous multihull and catamaran test models.

There are inherent limits to the catamaran SES or multihull SES type boats. For example, a proper combination of pneumatic and hydrodynamic lift was assessed to make a commercially viable cargo load bearing boat with the least amount of resistance and drag. The combination of pneumatic and hydrodynamic lift has load bearing limits beyond which increasing either the amount of pneumatic lift (i.e. the square feet of air cavity below the hull) or hydrodynamic lift (i.e. the square feet of wetted surface area of the hull) excessively increased the drag of the hull through the water. The hulls get too wide and result in significantly more drag as they are widened. It was also found that the tunnels of the multihull and catamaran surface effect ship designs are a source of considerable drag unlike conventional multi-hulls and catamarans that utilize narrow hulls and depend solely on hydrodynamic lift. The present invention has about thirty-five percent less drag than catamarans of the conventional bottom and wave piercing type of the same weight. The water line advantage of wave piercing catamarans does not apply to surface effect multihulls and catamarans. Conventional and wave piercing catamarans require either non-active or active ride control systems such as hydrofoils to make the ride acceptable for passengers.

Numerous modifications can be made to the hulls of the boats and barges of the present invention while staying within the same inventive concept. For example, while high speed power boats would typically have three bows and two water flow channels and barges would have five bows and four water flow channels, other numbers are possible both even and odd numbers, preferably being odd in number and staggered as shown for a more streamlined design. Also, while intermediate bows apply mainly to barges, they may be incorporated into a power boat as well such as a power boat having five bows. In particular for barges, either towed or powered, three or more bows may be incorporated to create a surface effect marine platform to suite the desired width and beam of the vessel. The increased number of bows and water flow channels incorporated into the barge results in less impact from waves in rough seas and less overall resistance and drag. Likewise, while the boat and barge are shown with the main bow extending forwardly beyond the outboard bows and the intermediate bow, all of the bows may be of equal or differing in length. The main bow(s) can be shorter than outboard bows. Another aspect that can be changed is the seal which while shown as raised from the keel can be level with the keel. Air escapes from the highest point of the entire physical seal between the water and the air, fore to aft and outboard, but the stem seal seals better than the other seals because of the high flow of water that contacts the surface of the stem seal. However, there is less drag with the water if the stem seal is raised slightly. The more constant "footprint" of the surface area of the stem seal by the water in the dynamic mode of operation is more solid and consistent sealing than any of the other seals. Motion and trim of the boat or barge dictates this physical event of water being deposited past the stem seal whereas the other seals can be lifted from the surface of the water during operation of the boat or barge. Further modifications include, but are not limited to steps being incorporated into the side walls of the hull bordering the air cushion (the air cushion side walls), and to the aft inclined planning surface to break the laminar friction of the water passing along the hull reducing the resistance and drag of the hull along the water. Spray rails may be incorporated into the air cushion side walls, being located about one-fourth of the way upward from the keels to the top of the air cushion. Spray rails reduce the spray and wetted surface area of the hull passing through the water thus reducing the laminar friction, resistance, and drag of the hull.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teaching herein are particularly reversed especially as they fall within the breadth and scope of the claims here appended.

I claim as my invention:

1. An integrated entry surface effect marine platform for powered and unpowered marine vessels and barges which has reduced drag through water and improved wave penetration for rough sea operation, the marine platform being of a monohull design which utilizes pressurized air to reduce friction with the water, and which is supported in forward operation by a combination, of floatation, pneumatic lift, and hydrodynamic lift, and which utilizes superior wave penetration, the marine platform comprising:
   a plurality of bows each including respective pairs of bow inclines that begin at an upper shear line and continue down and aft, and outboard to a transverse stern seal forming respective outboard seats therealong;
   a plurality of water flow channels, one said channel being disposed between each pair of said plurality of bows;
   a keel for each bow, said keels originating at respective bases of said bows and continuing aft and outboard from respective center lines of said bows;
   a plurality of bow seals that originate at respective bases of said bows at respective forward ends of said keels and continue aft and outboard until said keels blend into said water flow channels and said outboard seals;
   an aft inclined lift surface that precedes said stern seal extending forward to an upper air cavity surface which extends into the respective water flow channels forming an air cavity thereunder, said air cavity originating at said bow seals, at said bases of the said bows, at respective forward ends of said keels, said air cavity continues aft and outboard, said air cavity blending into said water flow channels and said outboard seals;
   at least one air discharge duct through said upper air cavity surface through which the pressurized air is delivered to said air cavity;
   and wherein as the marine platform passes through the water, said aft inclined lift surface provides hydrodynamic lift to raise an aft end of the marine platform, said air cavity being filled with a flow of pressurized air from said air discharge ducts, said air cavity which restrains a cushion of pressurized air beneath the marine platform in operation to reduce water contact therewith to reduce laminar friction, said water flow channels which direct flows of displaced water from wave impacts into said air cavity wherein the air cushion and flow of pressurized air maintain the reduced contact with the water for reduced resistance and drag.

2. The marine platform of claim 1, wherein the keels are substantially flat, said keels and said outboard seals being a lowermost part of the marine platform defining a keel line of the marine platform.

3. The marine platform of claim 2, wherein the stem seal is slightly raised from the level of the keel line to induce a large flow of pressurized air and aerated water to flow thereby to lubricate a stem end of the marine vessel.

4. The marine platform of claim 1, wherein the bows include respective pairs of chines that originate at the respective pairs of bow inclines at the respective centerlines of the bows, respective outboard most of the chines which extend aft and outboard from the respective centerlines of said bows and form respective outboard inclined lift surfaces on respective outboard sides of the outboard bows, and also extend aft and inwardly from the respective centerlines of said bows, and blend into the respective water flow channels.

5. The marine platform of claim 4, wherein the pairs of chines and outboard inclined lift surfaces are inclined upwardly and outwardly to reduce vertical impacts and create hydrodynamic lift and support for the marine platform.

6. The marine platform of claim 1, wherein the keels each include a respective forward hydrodynamic lift surface.

7. The marine platform of claim 6, wherein the forward hydrodynamic lift surfaces are of a generally triangular shape.

8. The marine platform of claim 1, wherein respective side walls which define the air cavity are inclined inwardly, gradually transitioning to horizontally flat blending into the stern seal.

9. The marine platform of claim 1, additionally comprising a top deck affixed at the shear line.

10. The marine platform of claim 1, wherein the water flow channels incline downwardly toward a front end thereof and are flat toward a rear end thereof to create flotation and hydrodynamic lift during operation of the marine vessel.

11. The marine platform of claim 1, wherein the number of bows is an odd number.

12. The marine platform of claim 1, wherein the number of bows is an even number.

13. The marine platform of claim 1, wherein the bows are sharply designed to penetrate waves in an efficient manner to reduce impact and drag.

14. The marine platform of claim 1, wherein the marine platform includes three bows and two water flow channels for self-powered operation.

15. The marine platform of claim 14, wherein the three bows comprise a single main bow and a pair of outboard bows, said main bow being disposed between said outboard bows.

16. The marine platform of claim 15, wherein one of the main bow and the outboard bows extend forwardly past the other thereof.

17. The marine platform of claim 16, wherein the main bow extends forwardly of the outboard bows.

18. The marine platform of claim 16, comprising at least one additional main bow, at least one intermediate bow, and at least two additional water channels, said additional main bow being disposed laterally adjacent spaced from the main bow with said intermediate bow disposed between said main bows, said additional water channels being disposed adjacent said intermediate bow.

19. The marine platform of claim 15, wherein one of the main bow and the outboard hit bows are wider than the other thereof.

* * * * *

UNITED STATES PATENT AND TRADEMARK OFFICE
CERTIFICATE OF CORRECTION

PATENT NO. : 6,679,192 B2
DATED : January 20, 2004
INVENTOR(S) : Peter C. DeMarco It is certified that error appears in the above-identified patent and that said Letters Patent is hereby corrected as shown below:

Column 14,
Line 10, change "seats" to -- seals --

Signed and Sealed this

Seventh Day of September, 2004

JON W. DUDAS
*Director of the United States Patent and Trademark Office*